US012710779B2

(12) United States Patent
Sivaraj et al.

(10) Patent No.: US 12,710,779 B2
(45) Date of Patent: Aug. 18, 2026

(54) POWER MANAGEMENT SYSTEM WITH TIMING FROM AN ANALOG SOFT START CIRCUIT

(71) Applicant: NXP USA, Inc., Austin, TX (US)

(72) Inventors: Mahraj Sivaraj, Cedar Park, TX (US); Joaquin Alberto Romo Torres, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 225 days.

(21) Appl. No.: 18/618,102

(22) Filed: Mar. 27, 2024

(65) Prior Publication Data

US 2025/0306615 A1 Oct. 2, 2025

(51) Int. Cl.
*G05F 1/575* (2006.01)

(52) U.S. Cl.
CPC .................................... *G05F 1/575* (2013.01)

(58) Field of Classification Search
CPC ....................................................... G05F 1/565
See application file for complete search history.

(56) References Cited

U.S. PATENT DOCUMENTS

| | | | | |
|---|---|---|---|---|
| 5,828,206 | A * | 10/1998 | Hosono | G05F 1/569 323/273 |
| 6,680,837 | B1 | 1/2004 | Buxton | |
| 6,882,942 | B1 * | 4/2005 | Duduman | G06F 1/28 702/89 |
| 10,447,276 | B2 | 10/2019 | Shankar et al. | |
| 2003/0076079 | A1 | 4/2003 | Alcantar et al. | |
| 2006/0038238 | A1 * | 2/2006 | Lotfi | H10D 84/038 257/E21.639 |
| 2014/0152274 | A1 | 6/2014 | Lee et al. | |
| 2019/0199083 | A1 | 6/2019 | Okajima | |
| 2020/0161958 | A1 | 5/2020 | Ibrahim et al. | |
| 2022/0014009 | A1 | 1/2022 | Zhou | |
| 2022/0085812 | A1 * | 3/2022 | Singh | H03K 19/018521 |

* cited by examiner

*Primary Examiner* — Peter M Novak

(57) ABSTRACT

Examples of an apparatus and method for power management are disclosed. In an example, a device includes a charge circuit, a discharge circuit, an undervoltage detection circuit, wherein the charge circuit and the discharge circuit are couplable to a capacitor, and wherein the charge circuit includes an analog soft start circuit, and control logic configured to determine a discharge time of the capacitor in response to a timing signal that is generated in response to a voltage from the analog soft start circuit.

14 Claims, 9 Drawing Sheets

POWER MANAGEMENT SYSTEM WITH TIMING FROM AN ANALOG SOFT START CIRCUIT

BACKGROUND

In electrical systems, e.g., System-on-Modules (SoMs), System-on-Chips (SoCs), Microcontroller Units (MCUs), etc., a power management system, such as a Power Management Integrated Circuit (PMIC), may be used to help control and/or regulate electrical power. For example, a power management system may manage power-up and power-down of a connected system. PMICs may include a number of regulated power supplies to provide a full range of power supplies to devices such as MCUs, including ultra-low power linear regulators intended to remain "always on" to keep powering low power wake-up management circuits and real-time counter (RTC) domains. To support such ultra-low power operations, some PMICs provide an Ultra Low Power (ULP) state that targets quiescent currents, e.g., currents under about 10 uA. To achieve such quiescent currents, a corresponding digital state machine and associated analog circuits such as internal bandgaps, voltage regulators, and power-on reset (POR) circuits of a digital state machine are typically turned off to save power. Due to the absence of digital circuits to detect undervoltage conditions while in ultra-low power modes, there is a need for techniques that can detect and react to undervoltage conditions in always-on voltage regulators.

SUMMARY

Examples of a method and an apparatus for power management are disclosed. In an example, a device includes a charge circuit, a discharge circuit, an undervoltage detection circuit, wherein the charge circuit and the discharge circuit are couplable to a capacitor, and wherein the charge circuit includes an analog soft start circuit, and control logic configured to determine a discharge time of the capacitor in response to a timing signal that is generated in response to a voltage from the analog soft start circuit.

In an example, the control logic includes an analog timer circuit configured to generate the timing signal, the analog timer circuit including a comparator and a reset switch.

In an example, the comparator is coupled to a soft start capacitor of the analog soft start.

In an example, the comparator of the analog timer circuit is also coupled to a reference voltage.

In an example, the discharge time is a function of the reference voltage and a capacitance of the soft start capacitor.

In an example, the reset switch is configured to discharge the voltage from the analog soft start circuit in response to a timer reset signal.

In an example, the device is integrated into a PMIC.

In an example, the device is a PMIC, and the PMIC includes a pin for connection to the capacitor.

In an example, the control logic includes combination logic and latches to control the discharge time.

In an example, the control logic includes an AND gate configured to receive the timing signal and an undervoltage detection signal.

In an example, timing control logic includes an AND gate configured to receive the timing signal from the analog timer circuit and the undervoltage detection signal from the undervoltage detection circuit.

In an example, the control logic further includes a latch configured to generate an undervoltage fault signal in response to the output of the AND gate.

A power management system is also disclosed. The power management system includes a capacitor, a PMIC including a charge circuit, a discharge circuit, and an undervoltage detection circuit, wherein the charge circuit and the discharge circuit are coupled to the capacitor via a pin on the PMIC, and wherein the charge circuit includes an analog soft start circuit, and control logic configured to determine a discharge time of the capacitor in response to a timing signal that is generated in response to a voltage from the analog soft start circuit.

In an example, the control logic includes an analog timer circuit configured to generate the timing signal, the analog timer circuit including a comparator and a reset switch.

In an example, the comparator is coupled to a soft start capacitor of the analog soft start circuit, and wherein the comparator of the analog timer circuit is also coupled to a reference voltage.

In an example, the reset switch is configured to discharge the voltage from the analog soft start circuit in response to a timer reset signal.

A method for power management is also disclosed. The method includes generating an undervoltage signal in response to detecting an undervoltage condition at an output of a voltage regulator, and discharging the voltage regulator for a discharge time that is determined in response to a timing signal that is generated in response to a voltage from an analog soft start circuit of the voltage regulator and the undervoltage signal.

In an example, generating the timing signal involves comparing the voltage from the analog soft start circuit to a threshold voltage.

In an example, a timing circuit is coupled to the analog soft start circuit and wherein generating the timing signal involves comparing the voltage from the analog soft start circuit to a threshold voltage at the comparator.

In an example, the method further includes resetting the voltage of the analog soft start circuit after the discharge time has expired.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
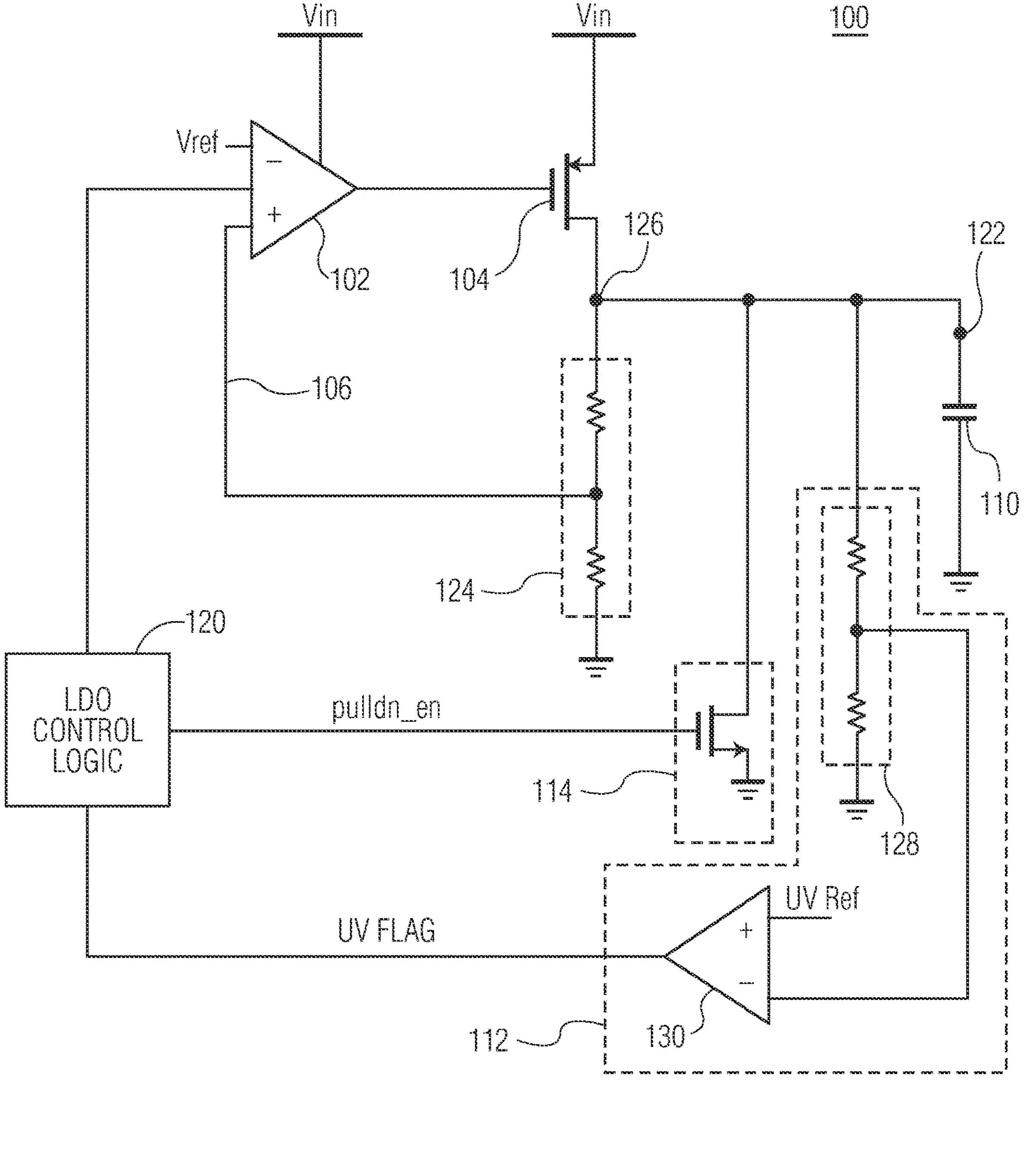
FIG. 1 is an example of an LDO regulator that includes LDO control logic.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

The examples described herein are directed to power management systems. As an example, a power management system includes a Power Management Integrated Circuit (PMIC) that, for example, receives a voltage input and provides a regulated voltage output. In some embodiments, PMICs may be connected to other systems (e.g., System-on-Modules (SoMs), System-on-Chips (SoCs), Microcontroller Units (MCUs)), such that the PMICs may manage power-up and power-down of the other systems. In some examples, the PMIC includes a voltage regulator, such as a low drop out (LDO) regulator.

FIG. 1 is an example of an LDO regulator 100 that includes an op-amp 102, an output transistor 104, an LDO feedback loop 106, an output capacitor 110 (off-chip), an undervoltage detection circuit 112, a discharge circuit 114, and control logic 120. In an example, the LDO regulator is implemented in a PMIC and the output capacitor is external to the PMIC and connected to the PMIC by a pin 122.

The op-amp 102 of the LDO regulator 100 is configured to compare a reference voltage (Vref) with a feedback voltage from the feedback loop 106 to control the output voltage of the LDO regulator, also referred to as the LDO output voltage. The output voltage of the op-amp is applied to a gate of the output transistor 104. The output transistor is configured to regulate and maintain an LDO output voltage at a desired output voltage, e.g., at a pin of a PMIC. In an example, the output transistor 104 is a field effect transistor (FET).

The LDO feedback loop 106 includes a resistor divider 124 (e.g., including two resistors in series), which is coupled to an LDO output 126, and a feedback line that connects to an input of the op-amp 102 to provide an LDO feedback signal. The LDO feedback loop is configured to provide stability and accuracy in regulating the LDO output voltage at the LDO output. The LDO feedback loop incorporates the op-amp and ensures that the LDO regulator responds promptly to load variations, maintaining a stable LDO output voltage.

The discharge circuit 114 of the LDO regulator 100 is configured to discharge the output capacitor 110 when the LDO regulator is turned off. For example, the discharge circuit is configured to pull down the output of the LDO regulator when the LDO regulator is turned off. In an example, the discharge circuit includes a pulldown FET that is controlled by a pulldown enable signal (pulldn_en) from the LDO control logic 120. In an example, the discharge circuit is configured to discharge the LDO output voltage enough to trigger POR circuits on the load (e.g., on an MCU).

The output capacitor 110 of the LDO regulator 100 is coupled to the LDO output 126 via the pin 122. In an example, the output capacitor is integrated into the LDO regulator to improve transient response, to reduce ripple in the LDO output voltage, and to enhance overall performance. The output capacitor also aids in stabilizing the LDO output voltage during varying load conditions. In an example, the pin is a pin on a PMIC that is configured to provide an electrical connection to the output capacitor. Typically, the output capacitor is "off-chip," that is, the output capacitor is not fabricated on the same IC device as the other circuits shown in FIG. 1. In other examples, the capacitor may be "on-chip."

The undervoltage detection circuit 112 of the LDO regulator 100 is configured to detect an undervoltage condition in the LDO regulator. In the example of FIG. 1, the undervoltage detection circuit includes a resistor divider 128 and a comparator 130. The resistor divider is coupled to the LDO output 126 and to one input of the comparator. The other input of the comparator is coupled to an undervoltage reference voltage (UVref). The undervoltage detection circuit provides an undervoltage detection signal (UV flag) to the LDO control logic 120 when the LDO output voltage drops below the undervoltage reference voltage (UVref). As is described below with reference to FIG. 3B, other examples of the undervoltage detection circuit are possible.

The LDO control logic 120 of the LDO regulator 100 is configured to control operation of the LDO regulator. In particular, the control logic is configured to control the amount of time that the output capacitor is discharged after an undervoltage condition has been detected and before the LDO regulator is allowed to restart. An example of the LDO control logic is described in more detail below with reference to FIG. 2.

Complex systems that utilize advanced MCUs often include an "off" operating mode with ultra-low quiescent currents to reduce power consumption while in the off operation mode. Such an off operating mode can help to extend the lifetime of battery-operated devices. Although off operating modes help to extend battery life, the devices should be able to listen and react to external requests to recover on demand to a fully functional operating mode.

PMICs may include a number of regulated power supplies to provide a full range of power supplies to MCUs, including ultra-low power linear regulators intended to remain "always on" to keep powering low power wake-up management circuits and real-time counter (RTC) domains. To support such ultra-low power operations, some PMICs provide an Ultra Low Power (ULP) state that targets quiescent currents, e.g., currents under about 10 uA. To achieve such quiescent currents, a corresponding digital state machine and associated analog circuits such as internal bandgaps, voltage regulators, and power-on reset (POR) circuits of a digital state machine are typically turned off to save power. Due to the absence of digital circuits to detect undervoltage conditions while in ultra-low power modes, there is a need for techniques that can detect and react to undervoltage conditions in always-on voltage regulators.

In normal modes of operation of a PMIC, a digital state machine is available to process undervoltage faults in various ways, including interrupt notification, input/output (I/O) controls, fault counters, etc. Such processing relies on the availability of a digital controller. In the case of an always-on voltage regulator, such as a low drop out (LDO) regulator, the voltage regulator should be able to be discharged completely to ensure the output voltage crosses the POR threshold of the load domain in a corresponding device (e.g., an MCU) in such way that a reset condition is guaranteed regardless of whether or not the undervoltage condition creates a latchup condition by itself.

A circuit of a PMIC designed to support an ultra-low power mode does not typically have a digital state machine running in order to save power. An LDO regulator, which is configured as disclosed herein, is designed to run with minimal current consumption. The LDO regulator has a set of latches that will retain configuration settings such as trim values, even when a digital state machine is off, e.g., One Time Programmable (OTP) fuse bit information is not available without the digital state machine.

To handle undervoltage faults, operation of an LDO regulator involves utilizing a low power analog circuits that are configured to; 1) detect an undervoltage condition, 2) turn on a discharge circuit (e.g., a pulldown FET), 3) wait for enough time to discharge the output capacitor through the discharge circuit, and 4) turn on the LDO regular again once the discharge time has expired. The above-described steps are directed to handling undervoltage conditions. If an undervoltage condition persists, the LDO regulator will indefinitely try to restart for as long as the undervoltage condition exists. Once an undervoltage condition ceases to exist, the LDO regulator will return to its set voltage. Such an operation may be similar to a "hiccup mode" in short circuit protection, but the disclosed technique aims to completely discharge the output capacitor of the LDO regulator to ensure POR circuits on the load (e.g., a connected MCU) are triggered.

In an example, the analog circuits to detect an undervoltage condition include a comparator and resistor divider that sample the output voltage of the LDO regulator. Most conventional LDO regulators include a discharge circuit. An aspect of the technique disclosed herein is the use of an existing analog soft start circuit coupled to an op-amp of an LDO regulator to generate a timing signal during a time in which the LDO regulator is turned off. Since an analog soft start circuit of the op-amp is typically only used during power up and not used again until the next power up, using the analog soft start circuit to generate a timing signal after an undervoltage condition is detected avoids the need to include an on-chip oscillator or other timing circuit to perform timing operations that ensure the output capacitor of the LDO regulator is sufficiently discharged after the undervoltage is detected and before the LDO regulator is restarted. Using the analog soft start circuit for discharge timing addresses the problem of handling an undervoltage fault in an LDO regulator in an ultra-low power mode where there is no digital state machine available to make decisions while in an undervoltage condition. Thus, the technique involves reusing an existing block of the LDO regulator, e.g., the analog soft start circuit, to act as part of a timing circuit, which avoids the need for an on-chip oscillator or other timing circuit. In an example, a disclosed device includes a charge circuit, a discharge circuit, and an undervoltage detection circuit, wherein the charge circuit and the discharge circuit are couplable to a capacitor, and wherein the charge circuit includes an analog soft start circuit. The device also includes control logic configured to determine a discharge time of the capacitor in response to a timing signal that is generated in response to a voltage from the analog soft start circuit. In one example, the control logic includes an analog timer circuit configured to generate the timing signal, the analog timer circuit including a comparator and a reset switch. In an example, the comparator is coupled to a soft start capacitor of the analog soft start. In an example, the comparator of the analog timer circuit is also coupled to a reference voltage. In an example, the discharge time is a function of the reference voltage and a capacitance of the soft start capacitor. In an example, the reset switch is configured to discharge the voltage from the analog soft start circuit in response to a timer reset signal. In an example, the device is integrated into a PMIC.

In an example, when in a low power state, an LDO regulator has no digital control available to manage undervoltage conditions because the digital controls are turned off to save power. An LDO regulator typically includes latches to retain trims and configurations (such as output voltage selections). The latches are used because trim and configuration data would need a digital supply, which is turned off when in a low power mode. An analog soft start circuit is commonly employed in LDO regulators to limit a rush of current during a start-up operation. The analog soft start circuit utilizes a small current to charge a large capacitor to create a time constant. The voltage of the capacitor is tied to an input gate that is parallel to differential inputs of the op-amp. The analog soft start circuit prevents the op-amp from railing at startup, limiting an inrush of current when an LDO regulator is turned on.

Figure 2:
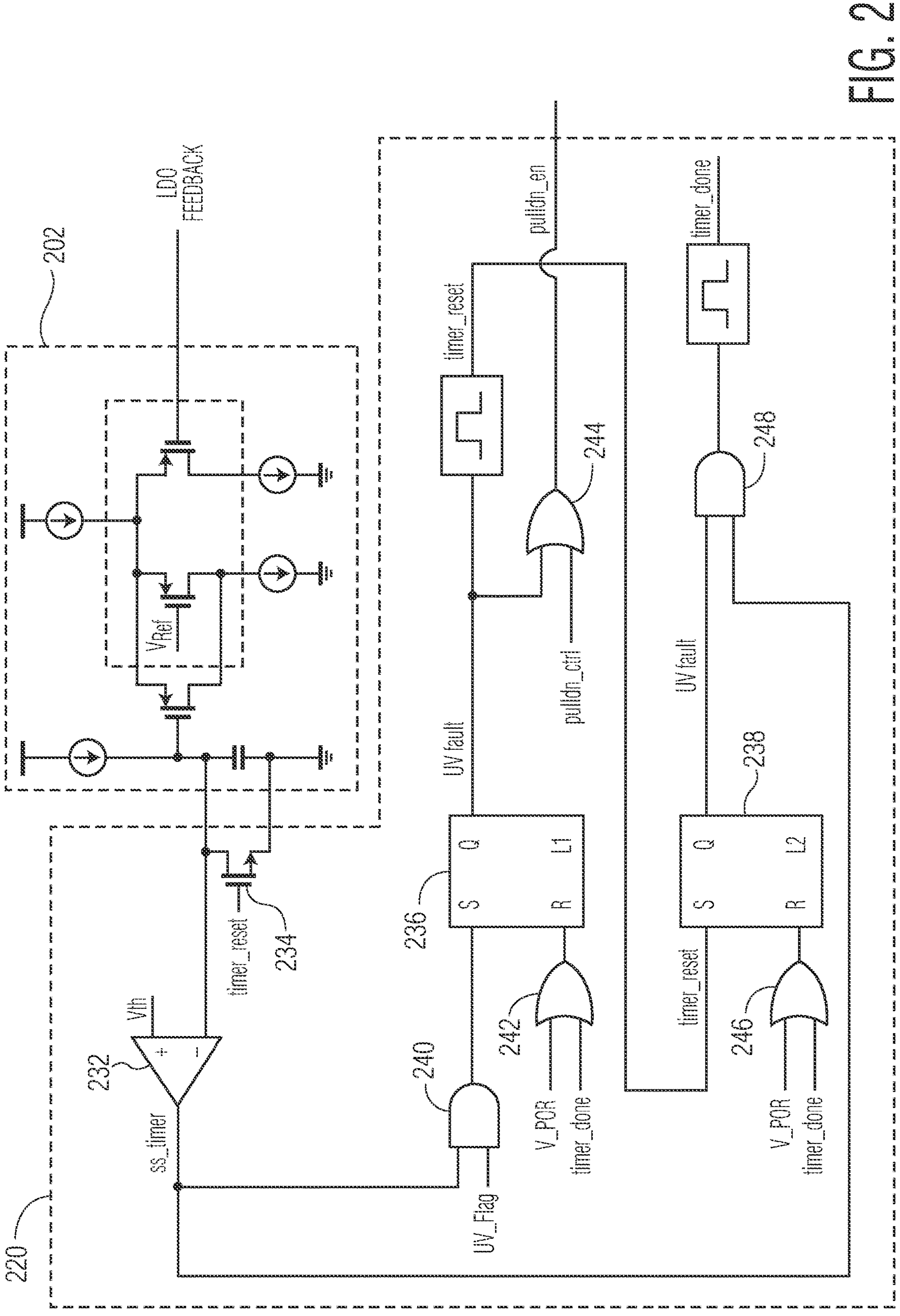
FIG. 2 is an expanded view of an example of LDO control logic that can be used in the LDO regulator described with reference to FIG. 1.

FIG. 2 is an expanded view of an example of LDO control logic 220 along with an example of an op-amp 202 that includes an analog soft start circuit that can be used in the LDO regulator 100 described with reference to FIG. 1. The op-amp and the analog soft start circuit are described in more detail below with reference to FIGS. 4 and 5.

With reference to the LDO control logic 220 shown in FIG. 2, the LDO control logic includes a comparator 232, a reset switch 234, a first latch 236 (L1), a second latch 238 (L2), and some combination logic (e.g., AND and OR gates). In the example of FIG. 2, the first latch (L1) is a Set-Reset (SR) latch that includes an S input, an R input, and a Q output. An AND gate 240 is coupled to the first latch (L1) and includes a first input (ss_timer) and a second input (undervoltage detection signal, UV flag). The output of the AND gate is coupled to the S input of the first latch (L1). An OR gate 242 is also coupled to the first latch (L1) and includes a first input (V-POR, voltage of POR) and a second input (timer_done). The output of the OR gate is coupled to the R input of the first latch (L1). The Q output of the first latch (L1) is an undervoltage fault signal (UV fault) that indicates when the LDO regulator is in an undervoltage condition and also serves as a timer reset signal (timer_reset). The undervoltage fault signal (UV fault) is also an input to an OR gate 244. The OR gate includes another input that receives a pulldown control signal (pulldn_ctrl) that goes high when the LDO regulator is turned off. The OR gate has an output that provides a pulldown enable signal (pulldn_en) that is used to turn on the discharge circuit (e.g., discharge circuit 114, FIG. 1).

In the example of FIG. 2, the second latch 238 (L2) is an SR latch that includes an S input, an R input, and a Q output. The timer reset signal (timer_reset) is provided to the S input of the latch (L2). An OR gate 246 is coupled to the R input of the latch (L2) and includes a first input (voltage of POR, V_POR), a second input (timer_done), and an output that is coupled to the R input of the second latch (L2). The Q output of the second latch (L2) is an undervoltage fault signal (UV fault) that indicates that the LDO regulator is in a fault condition. The undervoltage fault signal (UV fault) is provided as an input to an AND gate 248. The AND gate includes an input that receives the timing signal (ss_timer) from the comparator 232. The AND gate outputs the timer done signal (timer_done) when both the undervoltage fault signal (UV fault) and the timing signal (ss_timer) are asserted (e.g., high).

The latches 236 and 238 and the combinational logic 240, 242, 244, 246, and 248 are used to implement a technique for handling undervoltage conditions. In an example, operation of the LDO control logic 220 involves; 1) detecting an undervoltage condition (e.g., UV flag is high), 2) turning on a discharge circuit on the output pin of the LDO regulator (e.g., pulldn_en is high), 3) waiting a predetermined amount of time for the output capacitor to discharge through the discharge circuit, and then 4) turning on the LDO regulator.

Various components of the circuit described with reference to FIG. 2 are described below.

Figure 3A:
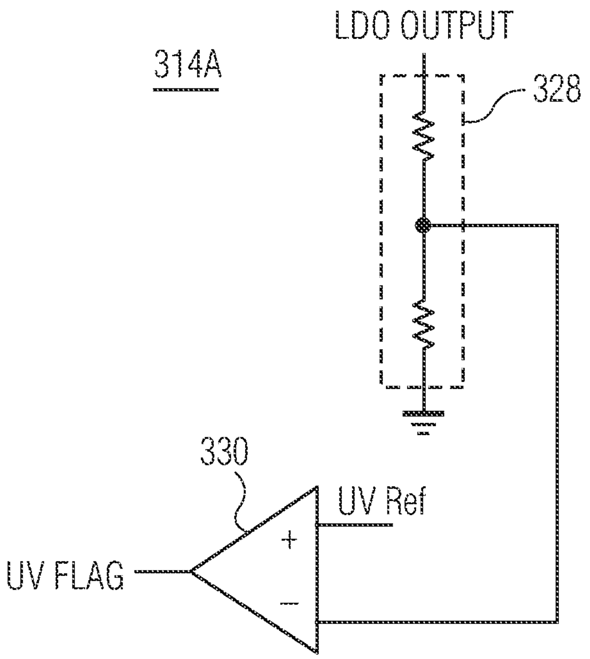
FIG. 3A is an example of an undervoltage detection circuit.
Figure 3B:
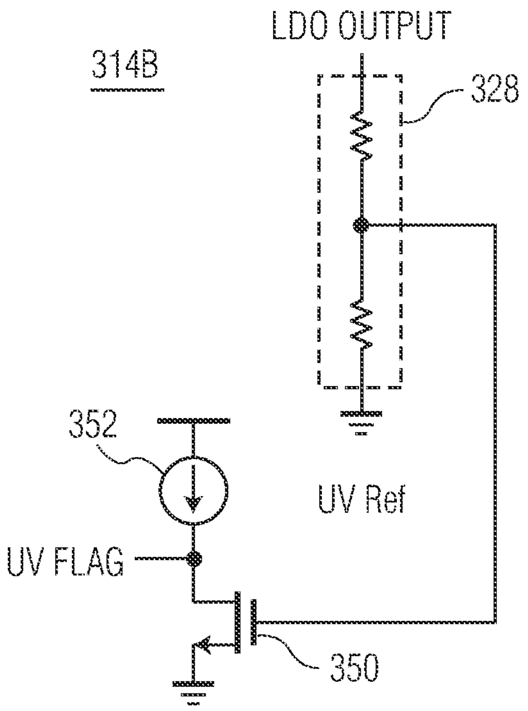
FIG. 3B is another example of an undervoltage detection circuit.

FIGS. 3A and 3B are two examples of an undervoltage detection circuit that can be used as the undervoltage detection circuit 114 in the LDO regulator 100 described with reference to FIG. 1.

FIG. 3A is an example of an undervoltage detection circuit 314A that utilizes a comparator 330 and resistor divider circuit 328 similar to that described with reference to FIG. 1. In the example of FIG. 3A, the comparator has one input coupled to the LDO output and one input coupled to an undervoltage reference (UVref), such as a bandgap or any other suitable reference voltage. In an example, the reference voltage may be in the range of about 0.5-1 volts (e.g., plus or minus 10%). The comparator of the undervoltage detection circuit outputs the undervoltage detection signal (UV flag) when the voltage on the LDO output drops below the reference voltage (UVref).

FIG. 3B is an example of an undervoltage detection circuit 314B that utilizes a transistor 350 and a resistor divider circuit 328. In the example of FIG. 3B, the transistor has a source connected to a voltage source 352 (e.g., a reference voltage, UVref), a drain coupled to ground, and a gate coupled to the LDO output. In an example, the reference voltage may be in the range of about 0.5-1 volts (e.g., plus or minus 10%). The transistor of the undervoltage detection circuit outputs the undervoltage detection signal (UV flag) when the voltage on the LDO output drops below the reference voltage (UVref).

Although two examples of an undervoltage detection circuit are described, other examples of the undervoltage detection circuit are possible.

Figure 4:
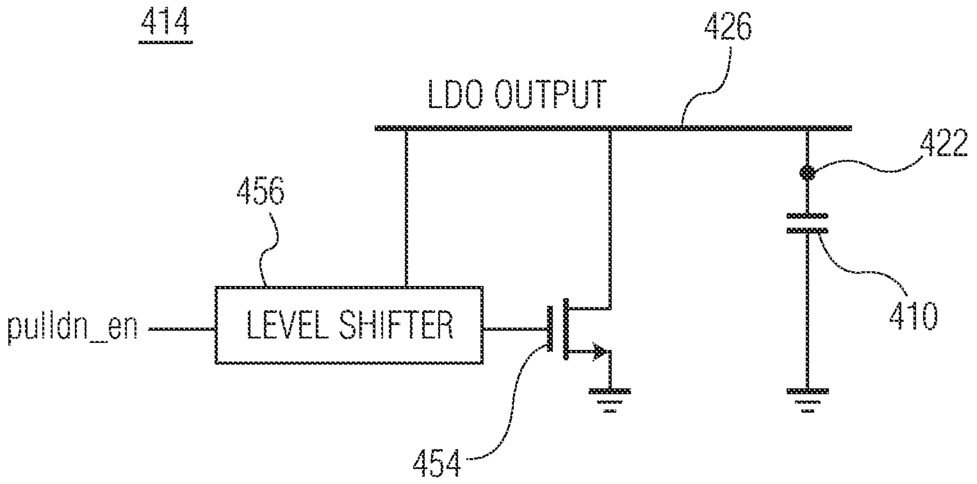
FIG. 4 is an example of a discharge circuit that can be used in the LDO regulator 100 described with reference to FIG. 1.

FIG. 4 is an example of a discharge circuit 414 that can be used in the LDO regulator 100 described with reference to FIG. 1 to discharge the system. In the example of FIG. 4, the discharge circuit 414 includes a pulldown transistor 454 connected to an LDO output rail 426 and to the output capacitor 410 via pin 422. In the example of FIG. 4, the gate of the pulldown transistor is controlled by the pulldown enable signal (pulldn_en) which may first pass through a level shifter 456. In an example, the pulldown transistor is an n-type metal-oxide-semiconductor (nMOS) transistor with a low drain-source resistance (RDS(on)) that is used to discharge the LDO output voltage when the LDO regulator is turned off. In an example operation, when the pulldown enable signal (pulldn_en) is on, the pulldown transistor is turned on and the external capacitor is discharged to ground, thereby discharging the LDO output voltage. Although an example of a discharge circuit is described with reference to FIG. 4, other configurations of a discharge circuit may be used in the LDO regulator.

Figure 5:
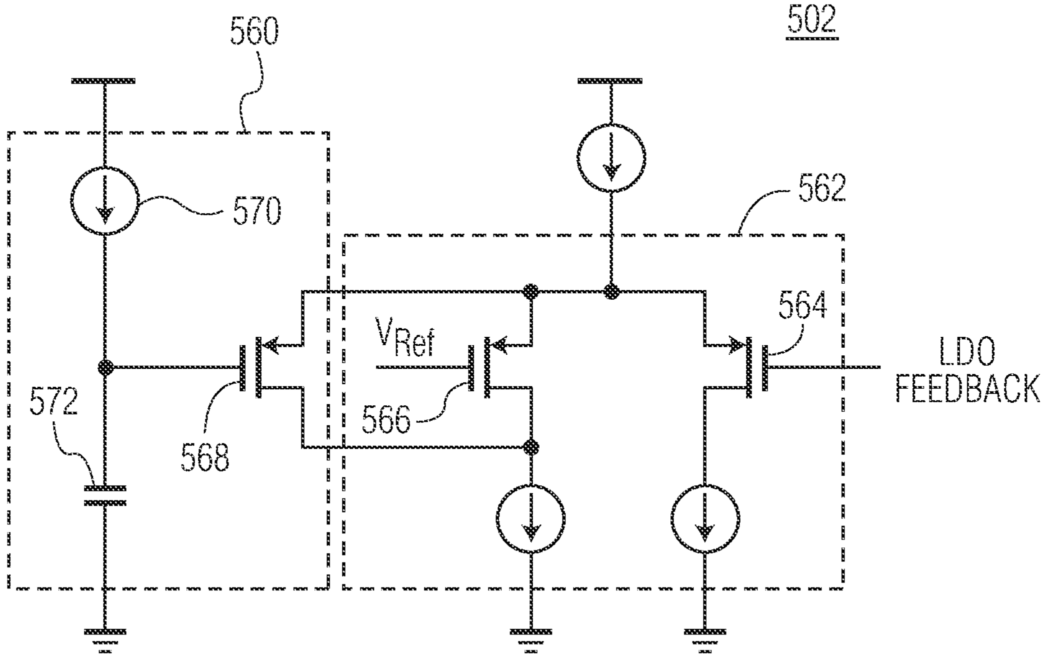
FIG. 5 is an example of an analog soft start circuit connected in parallel to a differential pair of an op-amp.

FIG. 5 is an example of an analog soft start circuit 560 connected in parallel to a differential pair 562 of an op-amp 502. In the example of FIG. 5, one transistor 564 of the differential pair is coupled to the LDO feedback signal (see FIG. 1) and the other transistor 566 of the differential pair is coupled to a reference voltage (Vref). The differential pair is connected to the analog soft start circuit 560 that includes a soft start transistor 568, a current source 570, and a soft start capacitor 572. In this example, the analog soft start circuit is realized by a constant current from the current source charging the soft start capacitor. The resulting voltage is used to drive a parallel input to the differential pair of the op-amp. During start-up of the LDO regulator, the analog soft start circuit controls the ramp up of the op-amp. In a conventional configuration of an op-amp with an analog soft start circuit, the analog soft start circuit is used only during power up. As described herein, the analog soft start circuit is repurposed to support a timing operation for recovery from an undervoltage condition. During an undervoltage condition, the analog soft start circuit is not used by the op-amp as the LDO regulator is in an off state.

In an example, when handling an undervoltage condition, it may be desirable that the output capacitor be sufficiently discharged before being turned on again. For example, the output capacitor is considered to be sufficiently drained when the LDO output voltage is low enough to trip a POR circuit in a connected device (e.g., a connected MCU). This is where the analog soft start circuit can be used to produce a timer, since the analog soft start circuit is not needed by the op-amp while the LDO regulator is in an off state.

During a normal power up of an LDO regulator such as the LDO regulator described with reference to FIGS. 1 and 2, the voltage on the capacitor of the analog soft start circuit is OV. Once the LDO regulator is enabled, the bias current will charge up the capacitor 572 of the analog soft start circuit 560. This will ensure that the output transistor 110 is not fully turned on in a single burst, thereby preventing a large in rush of current. Once the soft start operation has completed, the voltage on the capacitor is driven to supply, turning off the soft start transistor 568 that is coupled in parallel to the differential pair. The analog soft start circuit and corresponding startup technique are known to limit an in rush of current in an LDO regulator, and is found in conventional regulator designs. The analog soft start circuit is relatively simple and does not require a digital-to-analog converter (DAC) or digital controls to implement the soft start.

Figure 6:
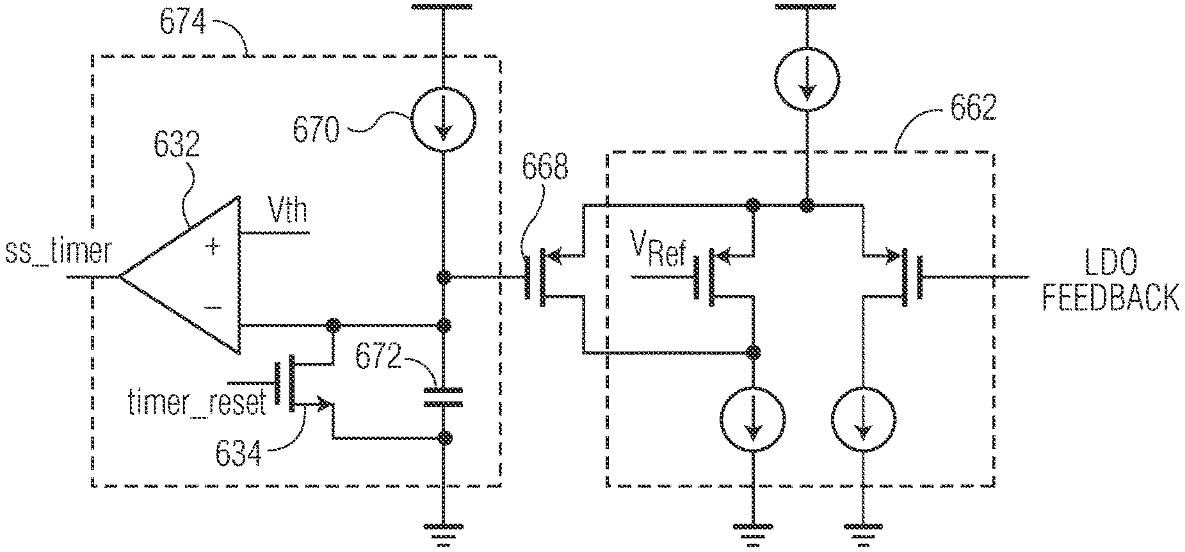
FIG. 6 is an example of an analog timer circuit that can be built using components of the analog soft start circuit described above with reference to FIG. 5.

FIG. 6 is an example of an analog timer circuit 674 that can be built using components of the analog soft start circuit 560 described above with reference to FIG. 5. In the example of FIG. 6, the analog timer circuit 674 includes the current source 670 and the capacitor 672 from the analog soft start circuit 560 described with reference to FIG. 5 along with a comparator 632 and a reset switch 634 to produce a discharge timer. As shown in FIG. 5, a first input of the comparator is coupled to one side of the soft start capacitor 672 and a second input of the comparator is coupled to a threshold voltage (Vth). In an example, the threshold voltage can be set to a value that corresponds to a desired time constant that is needed to discharge the output capacitor of the LDO regulator before the LDO regulator is restarted after an undervoltage condition has been identified. In an example, the soft start capacitor 672 of the analog soft start circuit and the current of the current source 670 are sized such that the analog soft start circuit can limit the current into the output capacitor of the LDO regulator. Thus, the size of the soft start capacitor of the analog soft start circuit is a function of the size of the output capacitor.

In an example, the comparator 632 of the analog timer circuit 674 is used to create a time constant based on the voltage of the soft start capacitor 672 of the analog soft start circuit. The comparator threshold can be set to achieve a desired time constant (e.g., time interval) that is needed to discharge the output capacitor of the LDO regulator before the LDO regulator is restarted.

Figure 7:
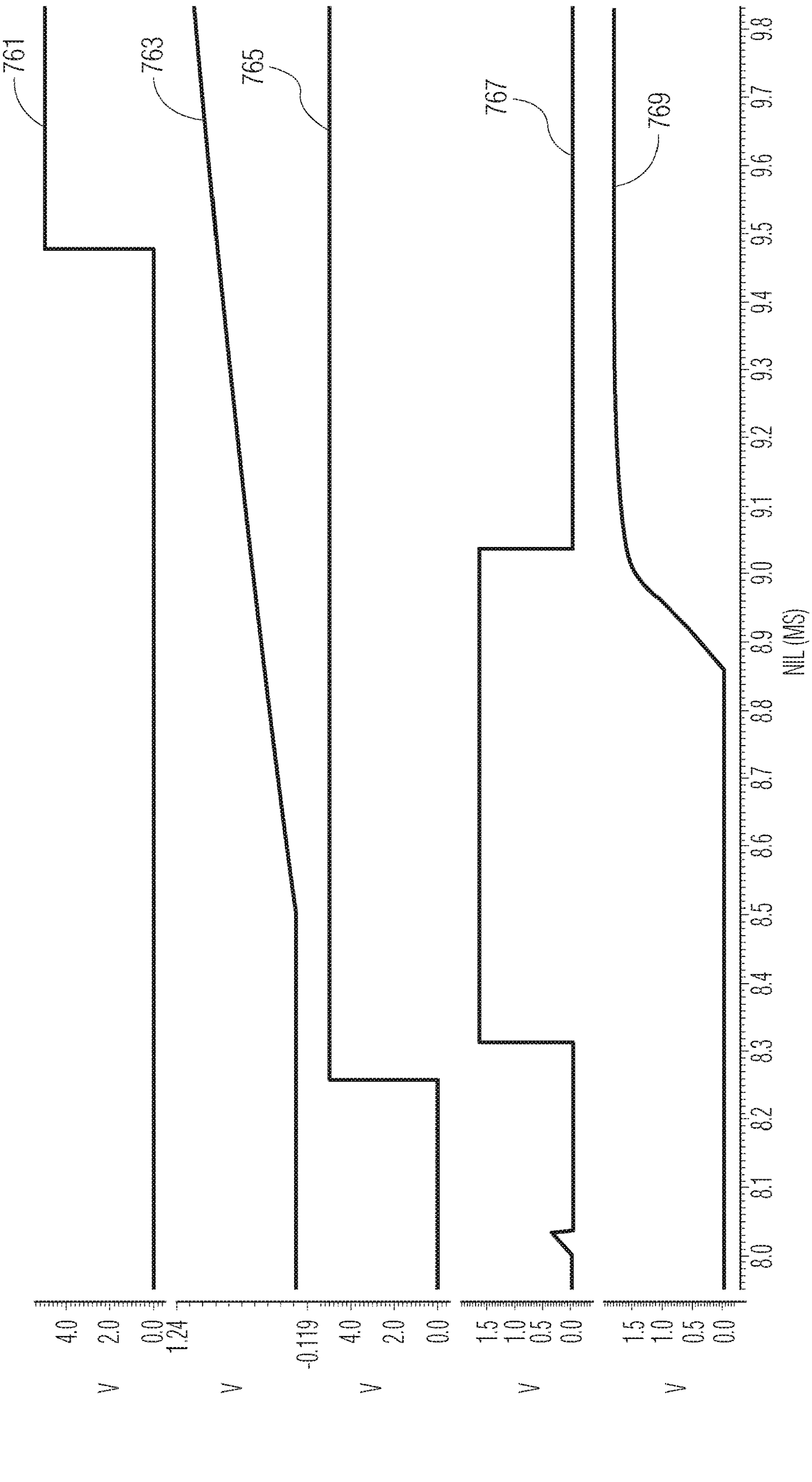
FIG. 7 is an example of waveforms that correspond to an LDO regulator that includes an analog soft start circuit and an analog timer circuit as described with reference to FIGS. 1-6.

FIG. 7 is an example of waveforms that correspond to an LDO regulator that includes an analog soft start circuit and an analog timer circuit as described with reference to FIGS. 1-6. In the example, of FIG. 7, the signals include a timing signal (ss_timer) 761, a voltage on the soft start capacitor 763, an LDO enable signal 765, an undervoltage detection signal 767 (UV flag), and an LDO output voltage 769. In FIG. 7, the soft ramp up of the LDO regulator is shown as the voltage on the soft start capacitor. The UV flag generated on powerup is ignored or masked until the timing signal (ss_timer) goes high. If the UV flag remains high after timing signal (ss_timer) goes high, then this indicates an undervoltage fault condition (e.g., UV fault asserted).

Figure 8:
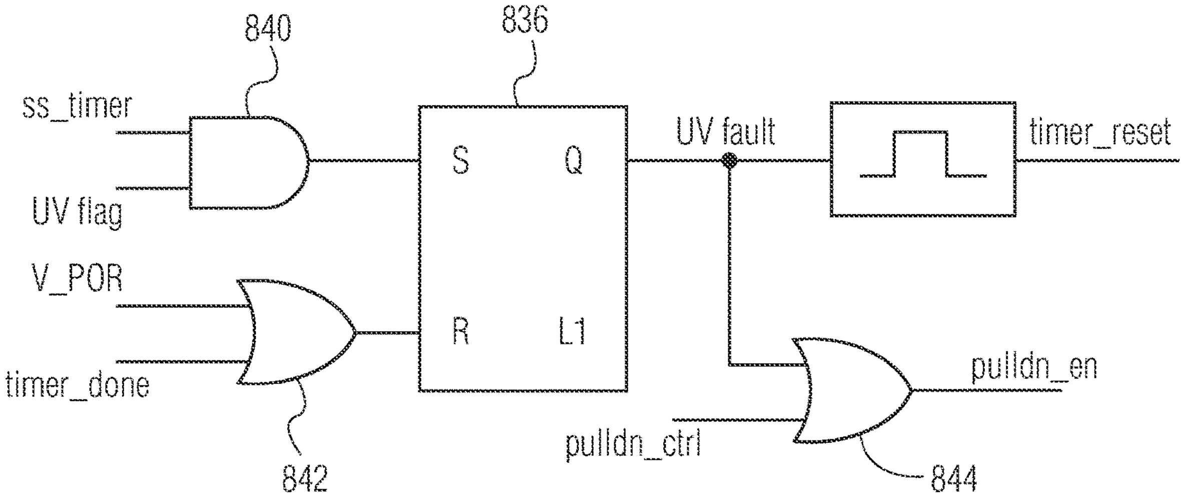
FIG. 8 is an example of a circuit that is configured to control the discharge time of the LDO regulator.

FIG. 8 is an example of a circuit that is configured to control the discharge time of the LDO regulator. The circuit includes an AND gate 840, an OR gate 842, a latch 836 (L1), and an OR gate 844. In an example, the latch (L1) is an SR latch that includes an S input, an R input, and a Q output. The AND gate includes a first input (ss_timer) and a second input (UV flag) and an output that is coupled to the S input of the latch. The OR gate 842 includes a first input (V_POR), and a second input (timer_done) and an output that is coupled to the R input of the latch. The OR gate 844 includes a first input that receives the signal (UV fault) from the Q output of the latch (L1) and a second input that receives the pull down control signal (pulldn_ctrl), which goes high when the LDO regulator is turned off. The OR gate 844 has an output that provides a pull down enable signal (pulldn_en) that is used to turn on the pull down transistor to drain the capacitor (FIG. 1). In operation, the latch (L1) outputs an undervoltage fault signal (UV fault) in response to the timing signal (ss_timer) and the undervoltage detection signal (UV flag). In an example, the undervoltage fault signal (UV fault) triggers the pull down signal (pulldn_en, see FIG. 2) and the undervoltage fault signal (UV fault) is used as the timer reset signal (timer_reset). The latch (L1) is reset by the supply POR signal (V_POR) or the timer done signal (timer_done) going high.

When an undervoltage condition is detected, (this could be a hard short or a soft short on the output) the output of the undervoltage detection circuit (e.g., UV flag) is latched. In an example, after detecting the undervoltage condition, the following events take place, 1) the pulldown enable signal (pulldn_en) is asserted to discharge the output capacitor, 2) the LDO regulator is disabled, 3) the analog timer circuit is reset (e.g., timer_reset is asserted), and the capacitor of the analog soft start circuit is allowed to charge (this is where the analog soft start circuit is repurposed to implement the analog timer circuit), 4) the comparator of the analog timer circuit is used to detect when the voltage of the soft start capacitor has reached a threshold (Vth), which corresponds to a desired time before a restart. In one example, a discharge time of 600 us is targeted to sufficiently discharge the output capacitor.

Figure 9:
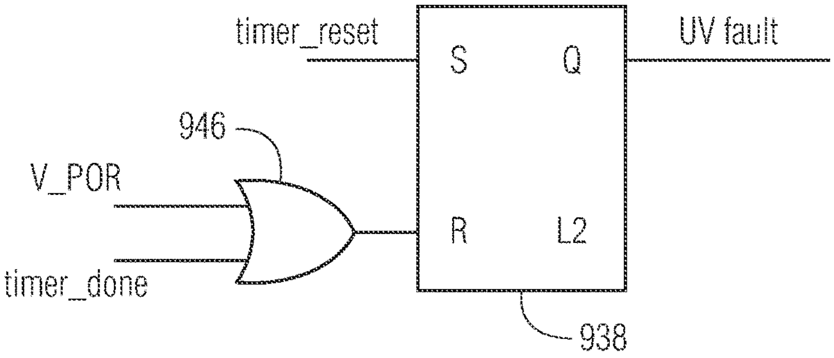
FIG. 9 is an example of a circuit that is configured to indicate a fault condition.

FIG. 9 is an example of a circuit that is configured to indicate a fault condition. The circuit includes an OR gate 946 and a latch 938 (L2). In an example, the latch is an SR latch that includes an S input, an R input, and a Q output. The OR gate includes a first input (V_POR), and a second input (timer_done) and an output that is coupled to the R input of the latch. The S input receives the timer reset signal (timer_reset) and the Q output, provides an undervoltage fault signal (UV fault). In an example, when an undervoltage condition is detected, the latch (L2) is used to reset the analog timer circuit.

After the analog timer circuit is reset, the soft start capacitor (FIG. 6, 634) will eventually charge up to the point that the comparator (FIG. 6, 632) trips (e.g., causing ss_timer to go high). The latch 938 (L2) is used to indicate that the LDO regulator is in a fault condition and not ready for a power-up. In another possible example, a register may be used instead of the latch (L2). A register would enable the counting of the number of undervoltage conditions that are detected.

Figure 10:
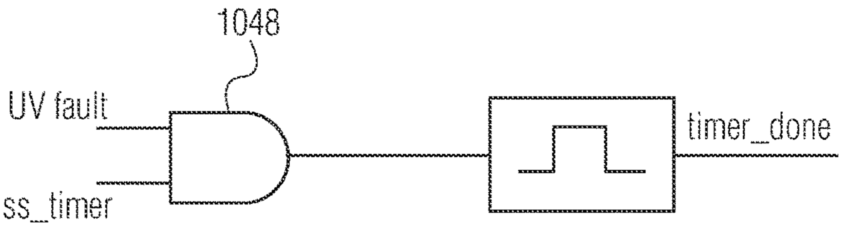
FIG. 10 is an example of an AND gate.

In an example, as soon as the analog timer circuit goes high (e.g., the soft start ramp in the fault condition has reached the required threshold, triggering ss_timer to go high), a monostable pulse (e.g., timer_done) is used to reset all the latches and the LDO regulator is restarted. FIG. 10 is an example of an AND gate 1048 that includes a first input (UV fault) and a second input (ss_timer) and an output (timer_done) that is coupled to the OR gates (FIG. 2, 242; FIG. 8, 842) and (FIG. 2, 246; FIG. 9, 946).

Figure 11:
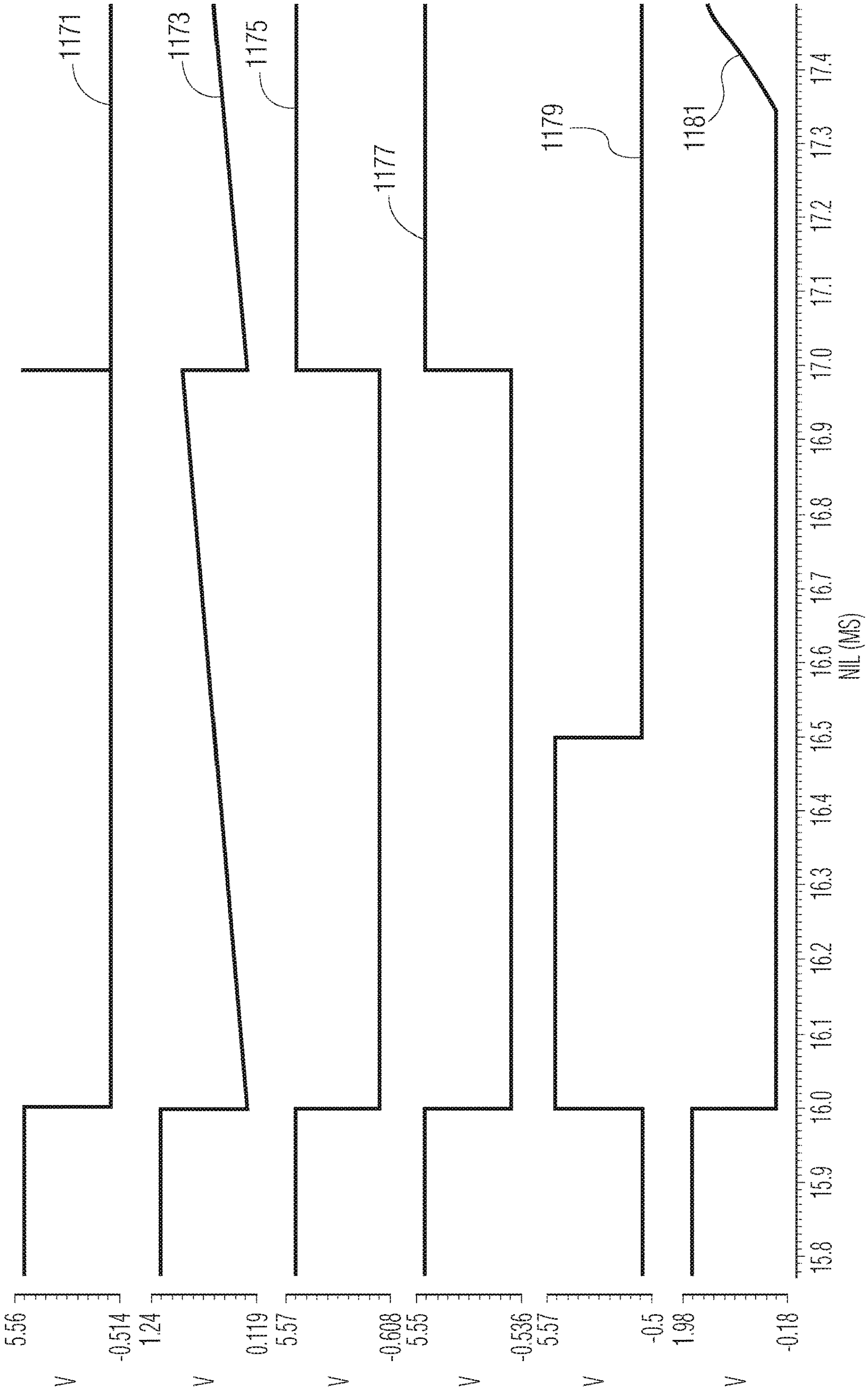
FIG. 11 is an example of waveforms that correspond to a restart of an LDO regulator that includes an analog soft start circuit and an analog timer circuit that utilizes components of the analog soft start circuit as described herein.

FIG. 11 is an example of waveforms that correspond to a restart of an LDO regulator that includes an analog soft start circuit and an analog timer circuit that utilizes components of the analog soft start circuit as described herein. In the example, of FIG. 11, the signals include the timing signal 1171 (ss_timer), a voltage on the soft start capacitor 1173 (soft start ramp, used for timing), an LDO enable signal 1175, the pulldown enable signal (pulldn_en) 1179, short status signal 1179, and the LDO output voltage 1181 (held low for about 1 ms, then allowed to restart). In the example of FIG. 11, the waveform 1173 shows the soft start ramp being reused during an undervoltage condition and then used in a normal power up operation. Once the undervoltage condition is latched, the LDO regulator is turned off, shown in the waveform 1175. If the fault is persistent, the restart of the LDO regulator will continue to restart indefinitely.

Figure 12:
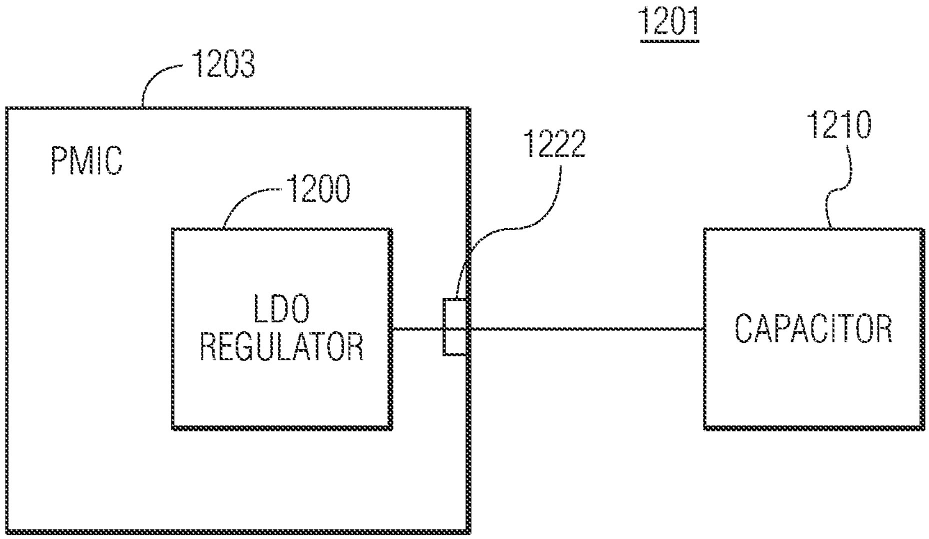
FIG. 12 depicts an example of a power management system that includes a PMIC and an external output capacitor.

As described above, the output capacitor of an LDO regulator may be external to a PMIC of a power management system. FIG. 12 depicts an example of a power management system 1201 that includes a PMIC 1203 and an output capacitor 1210 in which the output capacitor is external to the PMIC. In the example of FIG. 12, the PMIC includes an LDO regulator 1200, such as the LDO regulator described herein, and the output capacitor is coupled to the PMIC via a pin 1222 on the PMIC. Although the PMIC is shown as including one pin, the PMIC may include more than one pin for coupling the output capacitor to the PMIC.

Figure 13:
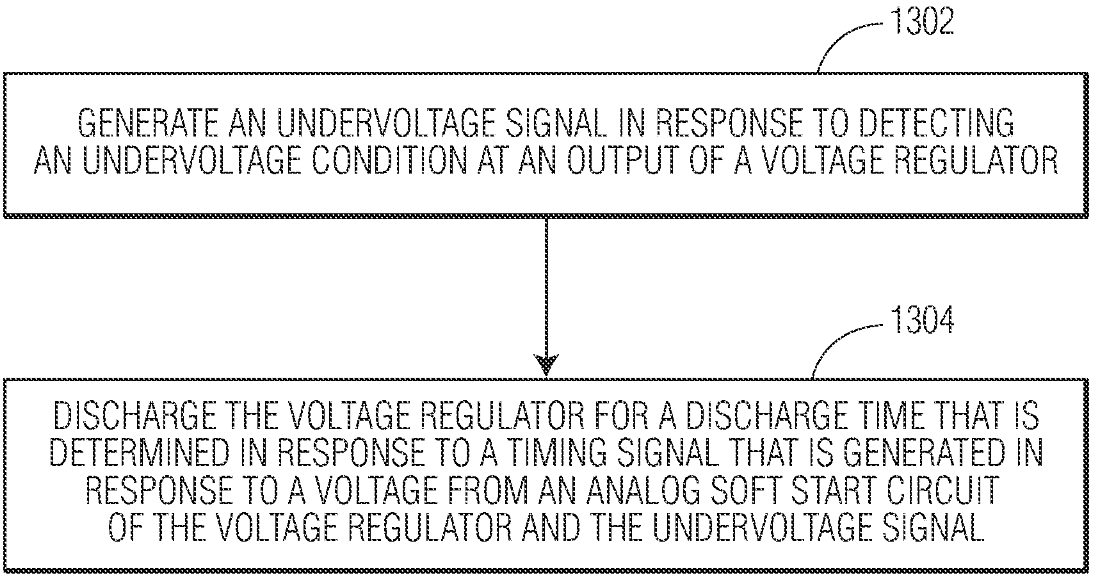
FIG. 13 is an example of a process for power management.

FIG. 13 is an example of a process for power management. The process involves, at block 1302, generating an undervoltage signal in response to detecting an undervoltage condition at an output of a voltage regulator, and at block 1304, discharging the voltage regulator for a discharge time that is determined in response to a timing signal that is generated in response to a voltage from an analog soft start circuit of the voltage regulator and the undervoltage signal.

In an example, an undervoltage condition is a condition in which the LDO output voltage is below a predetermined voltage. For example, an undervoltage condition may exist when the LDO regulator fails (e.g., failures may occur over the lifetime of the device), when the LDO regulator is overloaded, when the voltage supply of the LDO regulator drops below the output voltage capability of the LDO regulator, and/or a short on a PCB to which the device is connected.

The preceding detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connections as discussed herein may be any type of connection suitable to transfer signals or power from or to the respective nodes, units, or devices, including via intermediate devices. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. The term "coupled" or similar language may include a direct physical connection or a connection through other intermediate components even when those intermediate components change the form of coupling from source to destination.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

The foregoing description refers to elements or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device comprising:

a charge circuit including an analog soft start circuit that includes a soft start capacitor;

a discharge circuit;

an undervoltage detection circuit, wherein the charge circuit and the discharge circuit are couplable to an output capacitor; and control logic configured to determine a discharge time interval of the output capacitor in response to a timing signal that is generated in response to a voltage from the analog soft start circuit, wherein the control logic includes an analog timer circuit configured to generate the timing signal, the analog timer circuit including a comparator and a reset switch, wherein the analog timer circuit reuses the soft start capacitor of the analog soft start circuit to generate the timing signal during an ultra-low power mode of the device, wherein the comparator is coupled to the soft start capacitor and to a threshold voltage, and wherein the discharge time interval is a function of the threshold voltage and a capacitance of the soft start capacitor.

2. The device of claim 1, wherein the reset switch is configured to discharge the voltage from the soft start capacitor of the analog soft start circuit in response to a timer reset signal that is applied to the reset switch.

3. The device of claim 1, wherein the device is integrated into a power management integrated circuit (PMIC).

4. The device of claim 1, wherein the device is a power management integrated circuit (PMIC), and the PMIC includes a pin for connection to the output capacitor.

5. The device of claim 1, wherein the control logic includes combination logic and latches to control the discharge time interval.

6. The device of claim 5, wherein the control logic includes an AND gate configured to receive the timing signal and an undervoltage detection signal from the undervoltage detection circuit.

7. The device of claim 1, wherein the control logic includes an AND gate configured to receive the timing signal from the analog timer circuit and an undervoltage detection signal from the undervoltage detection circuit.

8. The device of claim 7, wherein the control logic further includes a latch configured to generate an undervoltage fault signal in response to the output of the AND gate.

9. A power management system comprising:

an output capacitor;

a power management integrated circuit (PMIC) including a charge circuit including an analog soft start circuit that includes a soft start capacitor, a discharge circuit, and an undervoltage detection circuit, wherein the charge circuit and the discharge circuit are coupled to the output capacitor via a pin on the PMIC; and control logic configured to determine a discharge time interval of the output capacitor in response to a timing signal that is generated in response to a voltage from the analog soft start circuit, wherein the control logic includes an analog timer circuit configured to generate the timing signal, the analog timer circuit including a comparator and a reset switch, wherein the analog timer circuit reuses the soft start capacitor of the analog soft start circuit to generate the timing signal during an ultra-low power mode of the PMIC, wherein the comparator is coupled to the soft start capacitor and to a threshold voltage, and wherein the discharge time interval is a function of the threshold voltage and a capacitance of the soft start capacitor.

10. The power management system of claim 9, wherein the reset switch is configured to discharge the voltage from the soft start capacitor of the analog soft start circuit in response to a timer reset signal that is applied to the reset switch.

11. A method for power management, the method comprising:

generating, while a voltage regulator is in an ultra-low power mode, an undervoltage signal in response to detecting an undervoltage condition at an output of the voltage regulator, wherein the voltage regulator includes a charge circuit including an analog soft start circuit that includes a soft start capacitor; and discharging, while the voltage regulator is in the ultra-low power mode, the voltage regulator for a discharge time interval that is determined in response to a timing signal that is generated in response to a voltage from the analog soft start circuit of the voltage regulator and the undervoltage signal, wherein an analog timer circuit reuses the soft start capacitor of the analog soft start circuit to generate the timing signal during the ultra-low power mode, the analog timer circuit including a comparator coupled to the soft start capacitor and to a threshold voltage, and a reset switch, and wherein the discharge time interval is a function of the threshold voltage and a capacitance of the soft start capacitor.

12. The method of claim 11, wherein generating the timing signal involves comparing the voltage from the soft start capacitor of the analog soft start circuit to the threshold voltage.

13. The method of claim 11, wherein the analog timer circuit a timing circuit is coupled to the analog soft start circuit and wherein generating the timing signal involves comparing the voltage from the soft start capacitor of the analog soft start circuit to the threshold voltage at the comparator.

14. The method of claim 13, further comprising resetting the voltage of the soft start capacitor of the analog soft start circuit after the discharge time interval has expired.

* * * * *